Nov. 15, 1949  
E. A. JOHNSON  
CATALYTIC CONVERSION OF HYDROCARBONS  
AND APPARATUS THEREFOR  
Filed May 10, 1941
2,488,032
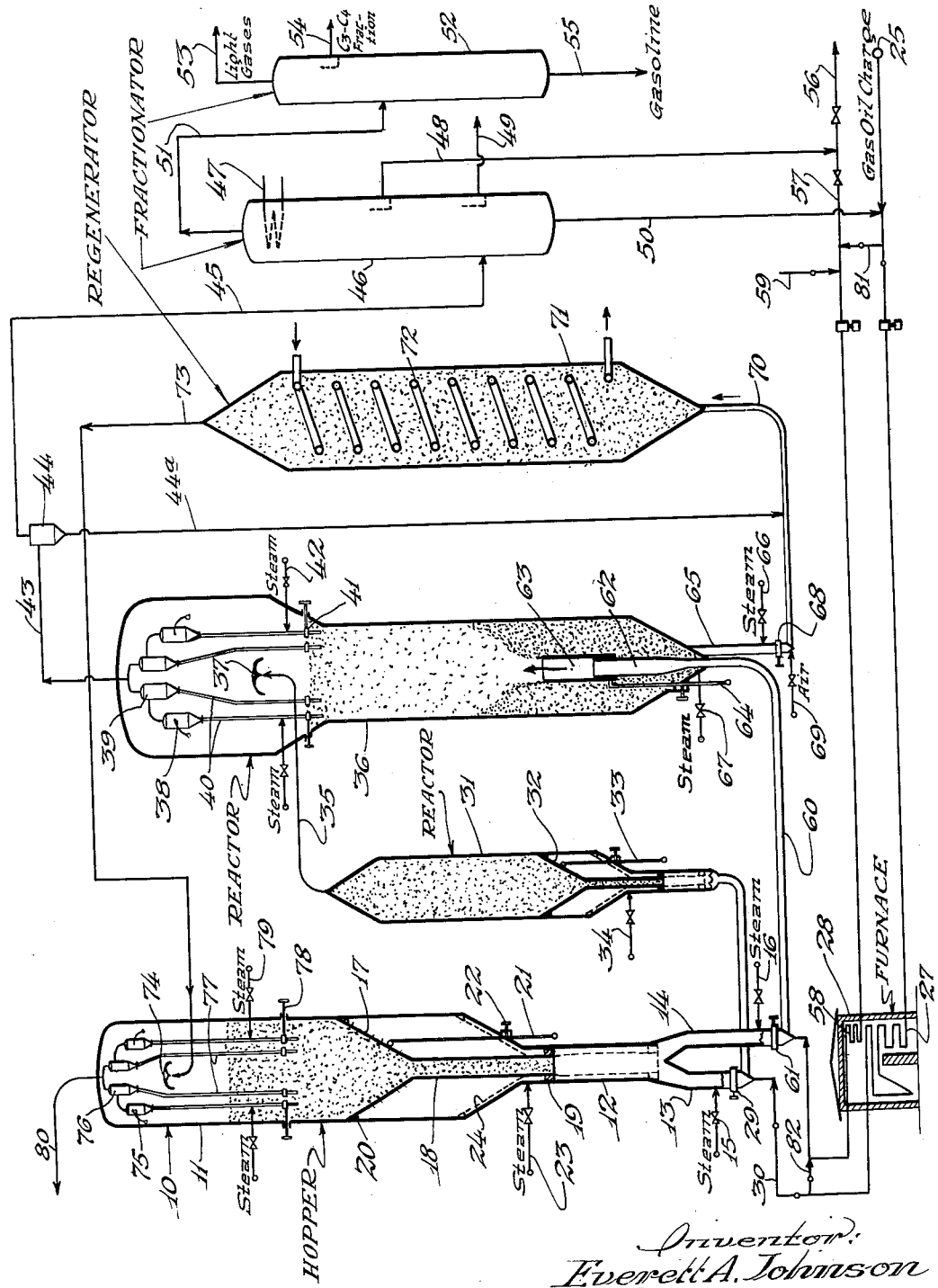
Inventor:  
Everett A. Johnson  
By Donald E. Payne  
Attorney.

Patented Nov. 15, 1949

2,488,032

UNITED STATES PATENT OFFICE 2,488,032

CATALYTIC CONVERSION OF HYDROCARBONS AND APPARATUS THEREFOR

Everett A. Johnson, Park Ridge, Ill., assignor to Standard Oil Company, Chicago, Ill., a corporation of Indiana Application May 10, 1941, Serial No. 392,846

19 Claims. (Cl. 196—52)

This invention relates to a catalytic conversion system and it pertains more particularly to a system for handling finely divided or powdered catalyst which is alternately on stream and undergoing regeneration. The invention will be described as applied to a process for cracking gas oil or heavier hydrocarbons for the production of high quality motor fuel but it should be understood that the invention is applicable to other hydrocarbon process and, in fact, to any conversion process wherein a powdered catalyst promotes a reaction while suspended in gases or vapors. Catalyst may then be separated from reaction products, regenerated while suspended in a regeneration gas and be finally separated from the regeneration gas and returned to the conversion step.

Certain of the features of apparatus and operation herein set forth are separately described and claimed in the following applications: Page Ser. No. 376,763, filed January 31, 1941; Scheineman Ser. No. 392,848, filed May 10, 1941; Scheinemen Ser. No. 400,956, filed July 3, 1941; and Gunness Ser. No. 400,958, filed July 3, 1941. Related applications include Johnson Ser. No. 392,847, filed May 10, 1941, and Scheineman Ser. No. 440,566, filed April 27, 1942.

An object of my invention is to provide improved methods and means for obtaining and maintaining desired catalyst-to-oil ratios, space velocities, catalyst residence times and vapor contact times in the reaction chamber. A further object is to provide improved methods and means for controlling pressures in various parts of the system, particularly at the base of aerated standpipes or conversion chambers. A further object is to provide improved methods and means for regulating the total amount of suspended catalyst in a reactor.

A further object of the invention is to provide a method and means for obtaining more effective utilization of catalyst than has heretofore been possible. A further object is to provide an improved combination of reactor and catalyst separator wherein catalyst may be withdrawn from the base of the reactor regardless of the point of catalyst introduction and wherein means are provided for preventing any substantial amount of catalyst from passing overhead with gases or vapors.

A further object of the invention is to provide a method and means for treating separate stocks in separate reactors, for recycling fractions to the particular reaction for which it is most suited and for utilizing catalyst in one reactor which has become partially spent in the other reactor. Other objects of the invention will be apparent as the detailed description thereof proceeds.

In practicing my invention a vaporized gas oil charging stock is passed through an up-flow reactor, through a dense turbulent suspended catalyst phase after which the catalyst is separated from reaction vapors and these vapors are fractionated into gas, gasoline, gas oil and heavy fractions. The separation of catalyst from products may be effected in the top of an up-flow reactor and this separated catalyst may be reintroduced into the dense turbulent phase in that reactor from which it may settle out at the bottom and be withdrawn therefrom for regeneration. Charging stock vapors are introduced at the bottom of the reactor for maintaining the turbulent dense suspended phase of catalyst therein below the upper separation zone. Catalyst is permitted to settle below this lower vapor inlet and this settled catalyst is maintained in fluent form by aeration. If catalyst is introduced at the top of this reactor the catalyst flow will be downward in the tower while the vapor flow will be upward therein but in the main portion of the tower the catalyst will be a substantially uniform and homogeneous turbulent dense phase mixture.

A feature of the invention is the provision of means for regulating the volume of the dense phase suspended catalyst mixture in the reactor by raising or lowering the inlet of the gases or vapors which effect the suspension. A further feature of the invention is the regulation of pressure at the base of standpipes by raising or lowering a member which determines the effective length of the standpipes. The invention will be more fully understood from the following detailed description read in conjunction with the accompanying drawing which forms a part of the specification and which is a schematic flow diagram of my improved conversion system.

The invention will be described as applied to the catalytic cracking of gas oil by means of a powdered catalyst of the silica-alumina or silica-magnesia type. Such a catalyst may be prepared by acid treating bentonite clay or by incorporating alumina, magnesia, zirconia, thoria or other catalytic metal oxide on activated silica gel. Silica hydrogel for example may be ball-milled with alumina or magnesia and the resulting dough may be dried at about 240° F. and then activated by heating to a temperature of about 1000° F. No invention is claimed in the catalysts per se and they will, therefore, not be described in further detail.

In the specific example I will describe the use of an activated clay commonly marketed as Superfiltrol and having a particle size ranging from about 10 to 100 microns, i. e., about 200 to 400 mesh. Larger catalyst sizes may be employed by properly modifying the vapor velocity throughout the system as will be apparent to those skilled in the art. The bulk density of settled catalyst under conditions of mild aeration, i. e., with aeration gas velocity of about .05 to .5 feet per second may be about 25 to 35 pounds per cubic foot. When subjected to vertical gas or vapor velocities of about 1 to 3 feet per second these catalysts become suspended in a dense turbulent suspended catalyst phase which has a density of about 10 to 20 pounds per cubic foot. Above the dense turbulent suspended catalyst phase there may be a dispersed catalyst phase of lighter density.

The fresh and regenerated catalyst is stored in a combined hopper and standpipe vessel 10 which has an enlarged upper section 11 and a lower standpipe section 12 terminating in standpipe legs 13 and 14 respectively. Catalyst is aerated in this standpipe by steam or other inert gas introduced through lines 15 and 16 respectively. It is essential that the pressure at the bottom of these standpipe legs be maintained above a certain limiting value which in this particular example may be about 18 pounds per square inch, regardless of the amount of catalyst in the upper storage section. In order to maintain such pressures with the minimum amount of catalyst in the upper storage section I provide a funnel-shaped false bottom 17 in the upper hopper section. The discharge tube 18 is slidably mounted in standpipe 12. An asbestos packing 19 may seal the points of contact between the lower end of pipe 18 and the walls of standpipe 12 and a similar asbestos packing 20 may provide a seal between the upper edges of the false bottom and walls 11 of the enlarged upper section. This false bottom may be raised or lowered by one or more suitable rods 21 extending through a packing box and the false bottom may be held in fixed position by set screws or other clamping means 22. My invention is not limited to any particular means for positioning the false bottom and it should be understood that I may employ any pneumatic or mechanical means known to those skilled in the art. Steam is introduced into the space between false bottom and the outer chamber walls through line 23. This steam not only prevents catalyst from passing seals 19 and 20 but it also provides a certain amount of aeration at these points. By providing minute holes in false bottom 17, the steam introduced through line 23 may be used for aerating and stripping the catalyst in the upper part of the hopper.

If the false bottom is in its lowermost position (indicated by dotted lines 24) and there is only a few feet of catalyst above this false bottom, the pressure head of catalyst in the standpipe may be too small to maintain the pressure of 18 pounds per square inch at the base of the standpipe. In such an event I merely raise the false bottom to the necessary extent and thereby increase the pressure head on the catalyst. Since the diameter of the upper section may be eight or ten times the diameter of the standpipe, the false bottom may be raised to a considerable extent without materially changing the depth of the catalyst above the false bottom. For example, if the standpipe is 2 feet in diameter and the upper section is 16 feet and if the catalyst level is only 3 feet above the false bottom in its lower position, this false bottom may be raised 50 or 60 feet and there will still be a catalyst depth of about 2 feet above the false bottom in its upper position. By raising the false bottom 50 or 60 feet I may increase the pressure at the base of the standpipe by 6 or 8 pounds per square inch.

Gas oil charging stock from source 25 is forced by a pump to coils 27 of pipe still 28 wherein the gas oil is vaporized and heated to a transfer line temperature of about 850° to 950° F. at a transfer line pressure of about 10 or 15 pounds per square inch. Catalyst from standpipe leg 13 is introduced by valve or star feeder 29 into transfer line 30 in such amounts as to obtain a catalyst-to-oil weight ratio of about 1:1 to 10:1, usually about 4:1. The catalyst is thus suspended in the charging stock vapors and is introduced upwardly into the base of reactor 31. This reactor should be so designed as to provide a vertical vapor velocity of about 1 to 3 feet per second and it should be of such size as to contain the necessary amount of catalyst for effecting desired conversion. The space velocity in this reactor may be about 1 to 2 liquid volumes of gas oil charged per hour per volume of catalyst in the reactor (i. e., assuming that the catalyst in the reactor is in compact settled form). When employing catalysts of varying activity or employing different charging stocks it may be desirable to change the space velocity in the reactor and I may accomplish this by providing false bottom 32 which may be raised or lowered by one or more rods or other suitable means 33. Here again asbestos seals should be employed and a positive steam pressure should be maintained between the false bottom and the reactor chamber. Steam for this purpose may be introduced through line 34.

Reaction vapors together with suspended catalyst are then conducted by line 35 to the upper part of a second reaction chamber 36. The suspended catalyst stream may be directed against a baffle 37 which may be in the form of adjacent hemicylinders as illustrated in the drawing whereby catalyst particles are deflected downwardly and vapors pass upwardly from the end of the hemicylinders. Any catalyst particles which do not separate from the vapors by settling in the enlarged upper part of reactor 36 may pass through a multi-stage cyclone system diagrammatically illustrated by primary cyclones 38 and secondary cyclones 39 all of these cyclones being provided with dip legs 40 each of which is provided with externally controlled valves 41 and lines 42 for the injection of an aeration gas such as steam. The dip legs should be long enough so that the head of catalyst therein will balance the difference between the pressure in the upper part of the reactor and the pressure in the various cyclones.

The gases leaving the multi-stage cyclone system are withdrawn through line 43 to an additional separation system 44 which may be a cyclone separator, an electrostatic precipitator or any other conventional separation means. Catalyst separated at this point may be returned to the system through line 44a. Gases from this separation means are conducted by lines 45 to the lower part of fractionating tower 46.

The fractionation system forms no part of the present invention and it is, therefore, diagrammatically represented as a tower 46 provided with reflux means 47 at its top, gas oil fractions being withdrawn through lines 48 and 49 and a heavy bottoms fraction being withdrawn through line 50. The overhead gasoline and gases may be withdrawn through line 51 to another system diagrammatically illustrated by tower 52 from which light gases are taken overhead through line 53, a $C_3$—$C_4$ fraction through line 54 and a gasoline fraction through line 55. It should be understood that this last fractionation may be at higher pressure than the gas oil fraction, that water may be separated between the two fractionation steps and that any number of towers, stabilizers, absorbers, etc. may be employed in either or both systems.

Since the bottoms fraction may contain residual amounts of catalyst this fraction may be returned to coils 27 along with gas oil charging stock. A clean gas oil fraction may be withdrawn through line 48 and either discharged from the system through line 56 or recycled through line 57 through coils 58 in pipe still 28 or any other heating means. It should be understood that while I have illustrated a pipe still as the heating means I may employ any type of heat exchange system and particularly such a system designed to utilize the heat of regeneration which will be hereinafter described. Instead of recycling gas oil from line 48 through coils 58 I may introduce a thermally cracked naphtha or other charging stock through line 59. This light gas oil or heavy naphtha charge may be heated to a temperature of about 850 to 1050° F. in coils 58 and then passed through transfer line 60 into which powdered catalyst may be introduced from leg 14 to standpipe 12 in amounts regulated by valve or star feeder 61. In this case a considerably lower catalyst-to-oil ratio may be employed and, in fact, it may be unnecessary to introduce any catalyst at this point since these vapors will contact catalyst which has been only partially spent in reactor 31.

Transfer line 60 introduces the hot vapors through the upwardly directed pipe 62 into reactor 36. In order that I may regulate the level at which these vapors are introduced into the reactor I may provide a separate conduit 63 which is slidable over conduit 62 and which may be positioned by external control means 64. The vapors introduced from the top of pipe 63 pass upwardly through reactor 36 at a vertical velocity of about 1 to 3 feet per second and thus maintain the catalyst in this reactor in a state of turbulent dense phase suspension. Catalyst is separated from reaction products leaving the top of the reactor in the manner already described, these vapors being combined with vapors from reactor 31.

Catalyst continuously settles out of the dense phase turbulent zone so that there will be a layer of settled catalyst in the lower part of the reactor and around pipes 62 and 63. Catalyst is continuously withdrawn from the bottom of this layer through standpipe 65 which is aerated at its base with steam introduced through line 66. Additional aeration steam may be introduced through line 67 to maintain the settled catalyst in fluent form.

This spent catalyst is discharged from the base of standpipe 65 in amounts regulated by valve or star feeder 68 and is picked up by air introduced through line 69 and conveyed by line 70 to the lower part of regenerator 71. The regenerator may be similar in design to reactor 31 and it may likewise be provided with the false bottom for regulating the effective volume of the regenerator. The vertical velocity of the regeneration gases in the regenerator may likewise be about 1 to 3 feet per second so that regeneration will be effected while the catalyst is in dense turbulent suspension. A considerable amount of heat may be developed in this regenerator and in order that the temperature therein may be maintained at about 1000° F., I may provide cooling coils 72 therein or I may recycle regenerated or partially regenerated catalyst through an external cooler and then reintroduce it into the regenerator. Alternatively I may cool the spent catalyst to a sufficient extent before it is introduced into the regenerator so that any further cooling is unnecessary. A feature of the dense turbulent suspended catalyst system is that almost identical temperatures prevail throughout the entire reactor or regenerator.

Regeneration gases together with suspended regenerated catalyst are withdrawn through line 73 and introduced upwardly against baffle 74 in the upper part of chamber 11. Catalyst which does not separate by settling is removed by multistage cyclone system illustrated by primary cyclones 75 and secondary cyclones 76 all of which are provided with dip legs 77 with externally controlled valves 78 and aerating means 79. Regeneration gases leaving this chamber through line 80 may be passed through suitable heat exchangers and through an electrostatic precipitator or scrubber or other means for recovering the final traces of catalyst therefrom.

In the system hereinabove described I have taught the cracking of a heavy gas oil in reactor 31 and of a light clean gas oil or thermally cracked naphtha in reactor 36. It should be understood that my invention is not limited to this particular feature since a part of the original charging stock may be passed through line 81 to coils 58 for conversion in reactor 36. Reactor 36 may thus be operated at a higher temperature than reactor 31 to compensate for the loss in the activity of the catalyst which is discharged into reactor 36 from reactor 31. Coils 58 may be entirely dispensed with and transfer line vapors may be passed through line 82 to line 60. Other modifications will be apparent to those skilled in the art from the above description.

It is not always necessary nor desirable to employ reactor 31 and I may pass all of the charging stock vapors through line 82 and line 60 into reactor 36 with the necessary amount of catalyst introduced through valve 61. In this case the catalyst will all be introduced at the base of the reactor through pipe 63 and will be maintained in the turbulent dense phase suspended condition for a period of time to effect the desired conversion. Catalyst will continuously settle from this dense phase to the aerated mass at the base of the reactor and it will be withdrawn through standpipe 65 for regeneration. A feature of this system is the utilization of the pressure at the base of reactor 36 at the top of standpipe 65 for maintaining a sufficiently high pressure at the base of standpipe 65 for introducing the catalyst into the regeneration system. Thus the pressure at the top of pipe 63 may be about 13 pounds per square inch, the pressure at the top of standpipe 65 may be about 15 or 16 pounds per square inch and the pressure at the base of the standpipe may be about 18 pounds per square inch. Air may thus be introduced at a pressure of about 14 pounds per square inch which will be sufficient to carry the catalyst through the regenerator and back to the top of storage chamber 11. By raising or lowering pipe 63 I simultaneously alter the volume of dense phase catalyst suspension in the reactor and alter the pressure at the base of standpipe 65.

While I have described improved reactor structure it should be understood that this structure may likewise be employed for the regeneration side of my system. In other words, the regenerated catalyst may be withdrawn from the base of the regenerator in the same way that spent catalyst is withdrawn from the base of reactor 36. It should also be understood that spent catalyst from the base of reactor 36 may be recycled to reactor 31 by steam injection or by suspension in incoming vapors, in other words, standpipe 65 may be provided with two legs in the same manner as standpipe 12 and one of these legs may disperse catalyst into line 30.

While I have described in detail a specific example of my invention and specific operating conditions for use therein, it should be understood that my invention is not limited to the specific structure or to the particular operating conditions herein described since many modifications thereof will be apparent to those skilled in the art from the above detailed description.

It is contemplated that the contacting of the catalyst in zone 31 can be under conditions which activate the regenerated catalyst for use in zone 36. Thus for example my invention is adaptable to fluid catalyst hydroforming where long residence time and activated catalyst are desirable. Likewise the polymerizing properties of an isomerization catalyst can be spent by treating with a selected polymerizable stock in 31 and then used to isomerize in the second zone.

I claim:

1. In apparatus for handling aerated solids and suitable for use in a hydrocarbon conversion process, a vertical chamber provided with a cone-shaped bottom, a conduit communicating with the base of said chamber, a second conduit slidably engaging said first named conduit, a cone-shaped false bottom secured to the top of said second conduit, sealing means for sealing the lower end of the second conduit against the first conduit and for sealing the outer edges of the cone-shaped false bottom against the inner walls of the chamber, means for sliding said second named conduit along said first named conduit and for securing said second named conduit at fixed positions with respect to said first named conduit, means for introducing gases and finely divided solids at the base of said first named conduit and for introducing said gases and solids into said chamber through said second named conduit, means for separating finely divided solids from gases leaving the upper part of said chamber, and means for withdrawing gases from the upper part of said chamber.

2. In apparatus for handling aerated solids and suitable for use in a hydrocarbon conversion process, a combined hopper and standpipe which comprises an enlarged upper hopper terminating at its base with an elongated standpipe, a conduit in slidable engagement with said standpipe, a false bottom secured to the upper end of said conduit and extending to the inner hopper walls, means for raising and lowering said conduit and false bottom for varying the effective head in said standpipe, means for introducing steam between the bottom of the hopper and the false bottom and means for aerating finely divided solids in said hopper by means of steam introduced below said false bottom.

3. In apparatus for contacting solids with gasiform materials and suitable for effecting catalytic hydrocarbon conversion and catalyst regeneration, an up-flow vertical chamber provided with a cone-shaped bottom, inlet means for introducing finely divided powdered solids into the lower part of said chamber in a gas suspension, means for removing gases together with suspended solids from the upper part of the chamber, a false bottom in said chamber, a conduit secured to said false bottom and communicating with said inlet means, means for raising and lowering said false bottom for controlling the effective volume of said chamber and means for preventing solids and gases from entering a space between the false bottom and the chamber bottom.

4. The method of operating a catalytic conversion system employing powdered catalyst and suitable for effecting a hydrocarbon conversion process which method comprises heating hydrocarbon charging stock vapors to reaction temperature, suspending powdered catalyst in said hot reaction vapors, passing said suspended catalyst through an up-flow reaction zone at a vertical velocity for maintaining a dense suspended catalyst phase in said reaction zone, introducing reaction vapors together with suspended catalyst from said first reaction zone to the upper part of a second reaction zone, introducing a second stream of hydrocarbon charging stock vapors in the lower part of said second reaction zone at such a rate as to maintain a dense turbulent suspended catalyst phase in the intermediate part of said second reaction zone, separating catalyst from vapors leaving the upper part of said second reaction zone and returning said separated catalyst to the turbulent suspended catalyst mixture in said zone, settling catalyst from the turbulent dense phase in said zone to a relatively quiescent body of settled catalyst in the lower part of said second reaction zone and withdrawing catalyst from the lower part of said second reaction zone.

5. The method of claim 4 wherein the charging stock stream introduced into the first reaction zone consists essentially of heavy gas oil vapors and the charging stock entering the lower part of the second reaction zone consists essentially of light gas oil vapors.

6. The method of claim 4 wherein the vapors entering said first reaction zone consist essentially of gas oil and wherein the vapors entering the lower part of said second reaction zone consist essentially of thermally cracked naphtha.

7. The method of claim 4 wherein the temperature of vapors entering said first reaction zone is about 850 to 950° F. and the temperature of vapors entering the lower part of said second reaction zone is at least about 50° F. higher than the temperature of the vapors entering the first reaction zone.

8. The method of operating a powdered catalyst hydrocarbon conversion system which method comprises suspending a powdered catalyst in a first stream of hydrocarbon vapors and passing said stream through a first reaction zone under such conditions as to effect substantial conversion, passing reaction products and suspended catalyst from said first reaction zone to the upper part of a second reaction zone, separating catalyst from products in the upper part of the second reaction zone, passing the separated catalyst downwardly through said second reaction zone, passing a second stream of hydrocarbon vapors upwardly through said second reaction zone under conditions for effecting substantial conversion thereof, removing substantially catalyst-free products from the upper part of the second reaction zone and removing catalyst from the lower part of the second reaction zone.

9. The method of claim 8 which includes the further step of suspending additional powdered catalyst in the second hydrocarbon vapor stream which is introduced at the low point in the second reaction zone.

10. The method of claim 8 wherein the first hydrocarbon vapor stream consists essentially of heavy hydrocarbons and the second hydrocarbon vapor stream consists essentially of light hydrocarbons.

11. In apparatus for effecting hydrocarbon conversion by means of powdered catalyst a first vertical reactor, means for introducing hydrocarbon vapors and suspended powdered catalyst into said reactor and for withdrawing reaction products and suspended catalyst from said reactor, a second vertical reactor having an enlarged upper section, means for introducing hydrocarbon vapors at a low point in the second reactor, means for introducing reaction products and catalyst from the first reactor to the enlarged upper part of the second reactor, means for separating catalyst from gases and vapors in the upper part of the second reactor, means for withdrawing substantially catalyst-free gases and vapors from the upper part of the second reactor and means for withdrawing catalyst from the lower part of the second reactor.

12. The apparatus of claim 11 which includes means for introducing powdered catalyst at a low point in the second reactor.

13. The apparatus of claim 11 which includes a product fractionation system, means for returning one fraction from said fractionation system to said first reactor and means for returning another product from said fractionation system to said second reactor.

14. In a catalytic conversion system for handling finely divided solid catalyst, a first contacting chamber having upper and lower walls, means including a conduit extending through a lower wall of the chamber for introducing gases or vapors and suspended catalyst into said chamber at a low level, that portion of the chamber outside of said conduit means and below said low level being constructed and arranged for accumulating catalyst, means including a gas inlet for maintaining such accumulated catalyst in aerated condition, means communicating with said chamber below said low level for withdrawing dense phase catalyst downwardly from the said chamber, a second contacting chamber, means for introducing catalyst from said withdrawing means into said second contacting chamber, means for withdrawing catalyst from said second chamber and means communicating with said conduit means for returning said last-named catalyst to said conduit for introduction to said first contacting chamber.

15. In a powdered catalyst conversion system wherein catalyst is continuously introduced into a contacting chamber and gases or vapors are passed upwardly through said contacting chamber at such vertical velocities as to maintain a plurality of catalyst phases, the apparatus which comprises a vertical reactor, conduit means extending upwardly within said reactor for introducing suspended catalyst into said reactor and for continuously passing a gas or vapor upwardly into said reactor at such velocity as to maintain a dense turbulent suspended phase of catalyst above the upper end of said conduit means, means for introducing a gas at a low level in the reactor below the upper end of the conduit means whereby an aerated dense catalyst phase may be maintained in the reactor below the upper end of the conduit means, means for removing gases from the upper part of the reactor, a vertical standpipe extending downwardly from the reactor and communicating therewith below the upper end of the conduit means, means for withdrawing catalyst from the lower end of the standpipe, and means for maintaining the catalyst in said standpipe in aerated condition.

16. The apparatus of claim 15 which includes adjustable means for raising and lowering the effective level of communication between said conduit means and said reactor whereby the proportion of the aerated dense catalyst phase and the turbulent suspended catalyst phase within the reactor may be controlled.

17. In apparatus for handling aerated solids and suitable for use in a hydrocarbon conversion process, a vertical chamber, a conduit communicating with said chamber through the base thereof, a second conduit slidably engaging said first conduit for varying the level of communication with said chamber whereby solids suspended in gases may be introduced through said conduits at a determinable level into said chamber, means for separating solids from gases leaving the upper part of said chamber, an outlet for gases in the upper part of said chamber, a downwardly extending conduit leading from the lower part of said chamber for removing aerated solids therefrom and means for aerating solids in the lower part of said chamber.

18. The method of operating a hydrocarbon conversion process employing powdered catalyst which method comprises suspending a powdered catalyst in a gasiform hydrocarbon stream and passing said stream upwardly through a reaction zone of large cross-sectional area at such a rate as to maintain a dense phase of suspended catalyst in said zone, introducing catalyst from said reaction zone directly to a contacting zone of large cross-sectional area, introducing a second gasiform stream at a low point in said contacting zone and passing said stream upwardly at such a rate as to maintain a dense phase of suspended catalyst therein, passing catalyst downwardly from said last-named dense phase to a sub-adjacent zone, passing a third gasiform stream upwardly through the catalyst in said sub-adjacent zone, downwardly withdrawing catalyst from said sub-adjacent zone, maintaining the downwardly moving catalyst in aerated condition, introducing the withdrawn aerated catalyst into a regeneration gas stream and conveying it thereby to a regeneration zone of large cross-sectional area, maintaining a dense turbulent suspended catalyst phase in said regeneration zone by passing a regeneration gas upwardly therein at low velocity, returning at least a part of the catalyst from the regeneration zone for suspension in the gasiform hydrocarbon stream which is passed upwardly through said reaction zone and suspending at least a part of the catalyst from said regeneration zone in said second gasiform stream for admixture in the contacting zone with catalyst introduced thereto from said reaction zone.

19. The method of operating a hydrocarbon conversion system employing powdered catalyst which method comprises suspending a powdered catalyst in a vaporized gas oil stream and passing said stream upwardly through a reaction zone of large cross-sectional area at such a rate as to maintain a dense phase of suspended catalyst in said zone, introducing catalyst from said reaction zone directly to a contacting zone of large cross-sectional area, introducing a vaporized naphtha stream at a low point in said contacting zone and passing said stream upwardly at such a rate as to maintain a dense phase of suspended catalyst therein, passing catalyst downwardly from said last-named dense phase to a sub-adjacent zone, passing another gasiform stream upwardly through said catalyst in said sub-adjacent zone, downwardly withdrawing catalyst from said sub-adjacent zone, maintaining the downwardly withdrawn catalyst in aerated condition, introducing the withdrawn aerated catalyst into a regeneration gas stream and conveying it thereby to a regeneration zone of large cross-sectional area, maintaining a dense turbulent suspended catalyst phase in said regeneration zone by passing a regeneration gas upwardly therein at low vertical velocity, and returning at least a part of the catalyst from the regeneration zone for suspension in the vaporized gas oil stream which is passed upwardly through said reaction zone.

EVERETT A. JOHNSON.

REFERENCES CITED

The following references are of record in the file of this patent:

UNITED STATES PATENTS

| Number | Name | Date |
|---|---|---|
| 211,165 | Klemm | Jan. 7, 1879 |
| 1,984,380 | Odell | Dec. 18, 1934 |
| 2,079,158 | De Rachat | May 4, 1937 |
| 2,235,133 | Zimmerman | Mar. 18, 1941 |
| 2,239,801 | Voorhees | Apr. 29, 1941 |
| 2,248,196 | Plummer | July 8, 1941 |
| 2,253,486 | Belchetz | Aug. 19, 1941 |
| 2,273,076 | Voorhees | Feb. 17, 1942 |
| 2,276,081 | McGrew | Mar. 10, 1942 |
| 2,296,722 | Marancik et al. | Sept. 22, 1942 |
| 2,302,209 | Goddin | Nov. 17, 1942 |
| 2,303,047 | Hemminger | Nov. 24, 1942 |
| 2,340,878 | Holt et al. | Feb. 8, 1944 |
| 2,347,682 | Gunness | May 2, 1944 |
| 2,360,787 | Murphree et al. | Oct. 17, 1944 |
| 2,451,804 | Campbell et al. | Oct. 19, 1948 |

FOREIGN PATENTS

| Number | Country | Date |
|---|---|---|
| 411,477 | Great Britain | June 4, 1934 |